(12) United States Patent
Cheong et al.

(10) Patent No.: US 10,394,349 B2
(45) Date of Patent: Aug. 27, 2019

(54) SYSTEM AND METHOD FOR IMPROVED SYNCHRONIZATION BETWEEN DEVICES

(71) Applicant: STMicroelectronics Asia Pacific Pte Ltd, Singapore (SG)

(72) Inventors: Chee Weng Cheong, Singapore (SG); Leonard Liviu Dinu, Singapore (SG); Dianbo Guo, Singapore (SG); Kien Beng Tan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 15/953,017

(22) Filed: Apr. 13, 2018

(65) Prior Publication Data

US 2018/0232071 A1 Aug. 16, 2018

Related U.S. Application Data

(63) Continuation of application No. 14/199,210, filed on Mar. 6, 2014, now Pat. No. 9,971,421.

(51) Int. Cl.
| | |
|---|---|
| *G06F 3/038* | (2013.01) |
| *G06F 3/041* | (2006.01) |
| *H04L 27/00* | (2006.01) |
| *G06F 3/0354* | (2013.01) |

(52) U.S. Cl.
CPC .......... *G06F 3/03545* (2013.01); *G06F 3/038* (2013.01); *G06F 3/041* (2013.01); *G06F 3/0416* (2013.01); *G06F 2203/0384* (2013.01); *H04L 2027/0097* (2013.01)

(58) Field of Classification Search
CPC ...... G06F 3/044; G06F 3/03545; G06F 3/038; G06F 3/041; G06F 3/0416; G06F 2203/0384; H04L 2027/0097
See application file for complete search history.

(56) References Cited

U.S. PATENT DOCUMENTS

| | | |
|---|---|---|
| 5,291,526 A | 3/1994 | Ichikawa et al. |
| 2005/0187752 A1 | 8/2005 | Colby et al. |
| 2008/0158165 A1 | 7/2008 | Geaghan et al. |
| 2009/0256820 A1 | 10/2009 | Yanase et al. |
| 2009/0323457 A1 | 12/2009 | Shori |
| 2010/0066693 A1 | 3/2010 | Sato et al. |
| 2010/0155153 A1 | 6/2010 | Zachut |

(Continued)

*Primary Examiner* — Sung S Ahn
(74) *Attorney, Agent, or Firm* — Crowe & Dunlevy

(57) ABSTRACT

A system and method for synchronizing two devices in communication with each other. When communication between the two devices is to be established, a synchronization process may be invoked. In an embodiment, a first device may initiate sending synchronization signals having rising edge and falling edge pairs. The second device may include a controller configured to receive the synchronization signals. However, noise may inhibit the ability of the controller to correctly receive and/or interpret the synchronization signals. Noise may cause detection components to falsely detect noise as a synchronization signal or may cause detection components to miss detection of an actual synchronization signal. A window generator may be used to generate comparison windows for the controller to detect synchronization signals. Further, the detection window duration and start times may be adjusted based on previously detected (or undetected) synchronization signals in order to compensate for noise overshadowing synchronization signals.

28 Claims, 5 Drawing Sheets

(56) References Cited

U.S. PATENT DOCUMENTS

| | | |
|---|---|---|
| 2010/0212975 A1 | 8/2010 | Moon et al. |
| 2010/0252335 A1 | 10/2010 | Orsley |
| 2011/0291985 A1 | 12/2011 | Wakako et al. |
| 2012/0013555 A1 | 1/2012 | Maeda et al. |
| 2012/0068964 A1 | 3/2012 | Wright et al. |
| 2012/0113045 A1 | 5/2012 | Lai |
| 2012/0327041 A1 | 12/2012 | Harley et al. |
| 2013/0002597 A1 | 1/2013 | Nishimura et al. |
| 2013/0027338 A1 | 1/2013 | Nishimura et al. |
| 2013/0314361 A1 | 11/2013 | Saitoh et al. |
| 2014/0267071 A1 | 9/2014 | Shahparnia |
| 2014/0267075 A1 | 9/2014 | Shahparnia et al. |
| 2014/0347311 A1 | 11/2014 | Joharapurkar et al. |
| 2014/0354555 A1 | 12/2014 | Shahparnia et al. |

SYSTEM AND METHOD FOR IMPROVED SYNCHRONIZATION BETWEEN DEVICES

CROSS REFERENCE TO RELATED APPLICATIONS

This application is a continuation of U.S. application for patent Ser. No. 14/199,210 filed Mar. 6, 2014, the contents of which are incorporated herein by reference.

This application is related to U.S. application for patent Ser. No. 14/199,510, entitled SYSTEM AND METHOD FOR PHASE ERROR COMPENSATION IN SYNCHRONIZED DEVICES filed Mar. 6, 2014, and which is incorporated herein by reference in its entirety.

BACKGROUND

Computing devices today typically include a number of different components that may be used in conjunction with each other. Such computing devices may be configured to communicate capacitively with each other in several different ways. One such computing system that may utilize two different computing devices is a smart stylus device in conjunction with a touch screen device In this computing arrangement, a user may use a handheld stylus device having a transceiver therein capable of wireless communication with a paired device, such as a tablet computer or smart phone. When used in conjunction with each other, wireless communication between the devices may be initialized such that communication signals may be passed back and forth between the two devices. The initialization may be accomplished during a synchronization method wherein the signals to and from the stylus may be synchronized with signals to and from the touch screen. However, in certain environments, electrical noise may interfere and disrupt the synchronization process as one of the devices may misinterpret noise as being a synchronization signal from the other device.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for synchronizing two devices in communication with each other. In the embodiment discussed herein, the two devices may be a touch screen device and the second device may be a stylus associated with the touch screen device. When communication between the two devices is to be established, a synchronization process may be invoked and a synchronization algorithm may govern the electronic components involved with the synchronization process. In an embodiment, the stylus may initiate sending a synchronization signal having a series of pulses having 16 rising edge and falling edge pairs. Alternatively, the synchronization may be initiated by the touch screen device as well. The touch screen device includes a controller configured to receive the synchronization signals at specific time intervals and in a specific signal order. If the touch screen controller correctly receives the entirety of the synchronization signal (or enough of the synchronization signal, for example if the stylus sends 20 pulses and the touch screen device correctly receives 16 out of the 20 pulses), the two devices are then synchronized and additional signal communication may commence.

However, noise may inhibit the ability of the touch screen controller to correctly receive and/or interpret the synchronization signals. Noise may cause detection components of the touch screen controller to falsely detect noise as a synchronization signal or may cause detection components of the touch screen controller to miss detection of an actual synchronization signal. In an embodiment, a window generator may be used to generate comparison windows for the touch screen controller to detect synchronization edges. Thus, the detection components of the touch screen controller may only be active for specified windows of time in order to alleviate any false detections between synchronization signals. Further, the detection window duration and start times may be adjusted based on previously detected (or undetected) synchronization signals in order to compensate for noise overshadowing synchronization signals. These and other aspects of the devices, systems and methods of the embodiments described herein are discussed in greater detail below with respect to FIGS. 1-5.

Figure 1:
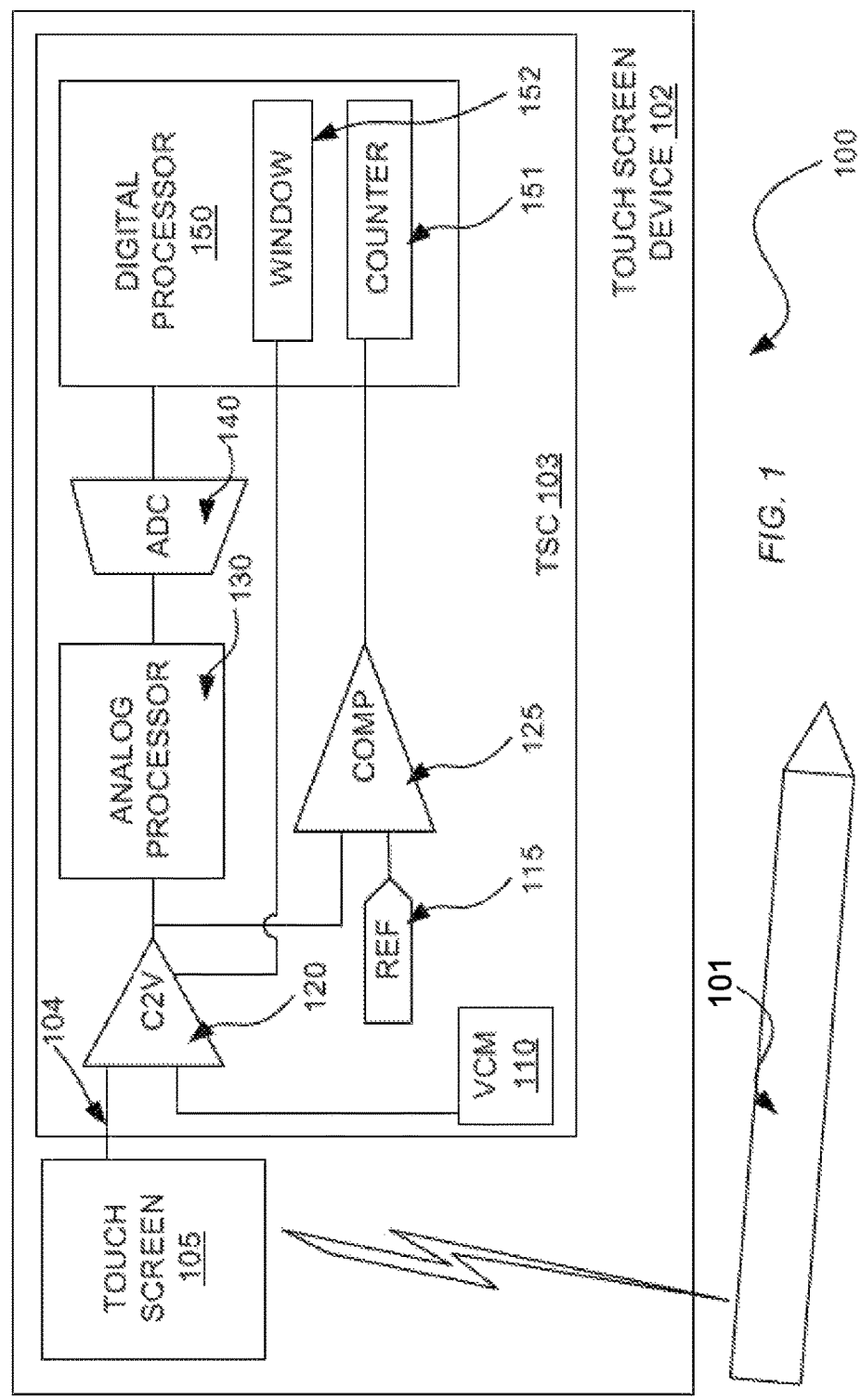
FIG. 1 is a block diagram of two computing devices configured to have wireless communication signals synchronized using an improved synchronization algorithm according to an embodiment.

FIG. 1 is a block diagram of two computing devices configured to have communication signals synchronized using an improved synchronization algorithm according to an embodiment. The two devices in this embodiment are a touch screen device 101 and an associated stylus 102 that together comprise the computing system 100 having the communicative capabilities as described herein. In the embodiment shown in FIG. 1, the communications signals may be received by the touch screen device 101 via a touch screen 105 that may be coupled to a touch screen controller 103. The signals received by the touch screen 105 may be done so from a remote device, such as a stylus 102 via a capacitive coupling. In this respect, the touch screen controller 103 includes a receiver to receive charge signals generated by the touch screen 105. This receiver is a charge-to-voltage converter 120 to interpret charge signals generated by the touch screen 105 via the capacitive coupling of the stylus 102. In order to provide a relative voltage output suitable for use within the touch screen controller 103, a common mode voltage reference 110 is provided as an input to the charge-to-voltage converter 120 to provide a charge basis for comparison in generating the output voltage of the charge-to-voltage converter 120. In other embodiment not shown, other communication components may be used to receive signals from the stylus 102.

Thus, communications occur between a touch screen 105 in the touch screen device 101 and the stylus 102. Such communications may result in a communication signal being received by the touch screen 105 and sent to a touch screen controller 103 for additional processing and interpretation. To this end, in order to establish communication protocol between the touch screen device 101 and the stylus 102, a synchronization process may be achieved for ensuring that signals sent to and from the stylus 102 are synchronized with signals sent to and from the touch screen device 101.

Such a synchronization process may be accomplished using a touch screen controller 103 that may employ a synchronization algorithm. The stylus 102 or the touch screen device 101 may initiate a synchronization process when the stylus 102 is moved into proximity of the touch screen device 101. This process may begin by the stylus 102 sending synchronization signals 104 to the touch screen device 101 to be received by the touch screen controller 103 at an expected sequence at expected intervals. In order to correctly receive and interpret the synchronization signals 104 received from the stylus 102, the touch screen controller 103 includes a number of components working in conjunction with a digital processor 150.

As shown in FIG. 1, the reference numeral 104 refers to an input to the charge-to-voltage converter 120. For the purposes of this disclosure this reference numeral simply refers to a signal propagating at this node. In the context of the synchronization algorithm discussed herein, this signal will simply be referred to as the synchronization signal 104 although it is understood that other signals from the stylus 102 (or any other device communicating with the touch screen controller 103) may be received here as well. Thus, synchronization signals 104 received from the stylus 102 are received at the charge-to-voltage converter 120.

When the synchronization process is invoked, a series of pulses may be initiated from the stylus 102. In one embodiment, the stylus 102 itself may initiate the process from a number of different events including the stylus moving into proximity with the touch screen device 101 or a user pressing a synchronization button on the stylus. Alternatively, the touch screen device 101 may initiate the synchronization process in similar manner. In the embodiment discussed in the next paragraphs, a synchronization algorithm utilizes a series of 16 synchronization pulses, each pulse consisting of a rising edge and falling edge. Other lengths of pulse sequences may be realized such as 8 or 32.

As the synchronization signals 104 are received, the charge-to-voltage converter 120 generates a voltage output in response to input charge stimulus from either a rising edge or a falling edge of the synchronization signal 104. When there is a rising edge of the synchronization signal 104, the output of the charge-to-voltage converter 120 will fall below a negative reference threshold after an exponential transient period. This transient period will be referred to as delay time Tau and is discussed further below with respect to the timing diagram of FIG. 2 that is associated with the embodiment of FIG. 1. Similarly, when there is a falling edge of the synchronization signal 104, the output of the charge-to-voltage converter 120 will rise above a positive reference threshold after the exponential transient period Tau. The negative and positive thresholds may be equivalent in magnitude. In other embodiments, the thresholds may be set to be different.

The output of the charge-to-voltage converter 120 is coupled to a first input of a comparator 125. A second input of the comparator 125 is coupled to a reference threshold node 115. This reference threshold node is the negative and positive reference thresholds referred to above. The comparator 125 is configured to compare the output of the charge-to-voltage converter 120 with the reference threshold 115. If the charge-to-voltage converter 120 output exceeds the negative reference threshold, the comparator 125 will generate a signal indicating detection of a rising edge in the synchronization signal 104. If the charge-to-voltage converter 120 output exceeds the positive reference threshold, the comparator 125 will generate a signal indicating detection of a falling edge in the synchronization signal 104. Rising edge signal and falling edge signals may be counted by a counter 151 within a digital processor 150. Further, the digital processor 150 includes a window generator 152 to provide an enabling control signal the charge-to-voltage converter 120 for edge detection. The window generator 152 functionality is discussed in further detail below.

In an embodiment briefly discussed above, once the counter 151 counts 16 pairs of rising edge and falling edge signals, the digital processor 150 determines that the stylus 102 and the touch screen device 101 are in synchronization. The counting of 16 pairs may be consecutive pairs of edges within a grouping of synchronization signals, such as 20 overall pairs. Alternatively, the 16 pairs may be any combination of 16 pairs within a groupings, such as 20 initial pairs. Once synchronization is determined, an analog processor 130 may be initialized and used to receive signals from the output of the charge-to-voltage converter 120 (which are now no longer synchronization signals, but rather typical communication signals generated from the synchronized stylus 102). The analog processor 130 conducts processing (not discussed or relevant herein) and provides analog communication signals to an analog-to-digital converter 140 for eventual use in the digital processor 150. As this analog path is not relevant to the synchronization algorithm, no further discussion is warranted.

In a noiseless communication environment, synchronization signals 104 are isolated from any other artifacts that may be present at the charge-to-voltage converter 120. Thus, the detection of rising and falling edges is easy to distinguish from other negligible transient signals (e.g., noise) that may be affecting the synchronization process. However, noiseless environments rarely exist in practice and noise may often be present from a 120-volt charger (not shown) that is coupled to the battery (also not shown) of the touch screen device 101. Thus, higher level transients at the charge-to-voltage converter 120 may cause enough of a voltage spike to be interpreted by the comparator 125 as either a rising edge or a falling edge. Thus, noise may cause the comparator 125 to interpret a voltage spike from noise to be a false edge or steady noise may cause the comparator 125 to be unable to detect an actual edge of the synchronization signal 104.

To overcome noise issues, improvements may be made to the synchronization algorithm in order to alleviate false edge detection or missed edge detection. In an embodiment, a window generator 152 may be used to generate comparison windows for the comparator 125. Thus, the comparator 125 may only be active for specified windows of time (i.e., a detection window) in order to alleviate any false detections between synchronization signal edges. This embodiment is discussed below with respect to FIG. 2. Further, the detection window duration and start times may be adjusted based on previously detected (or undetected) synchronization signal edges in order to compensate for noise overshadowing synchronization signal edges. This embodiment is discussed below with respect to FIG. 3.

Figure 2:
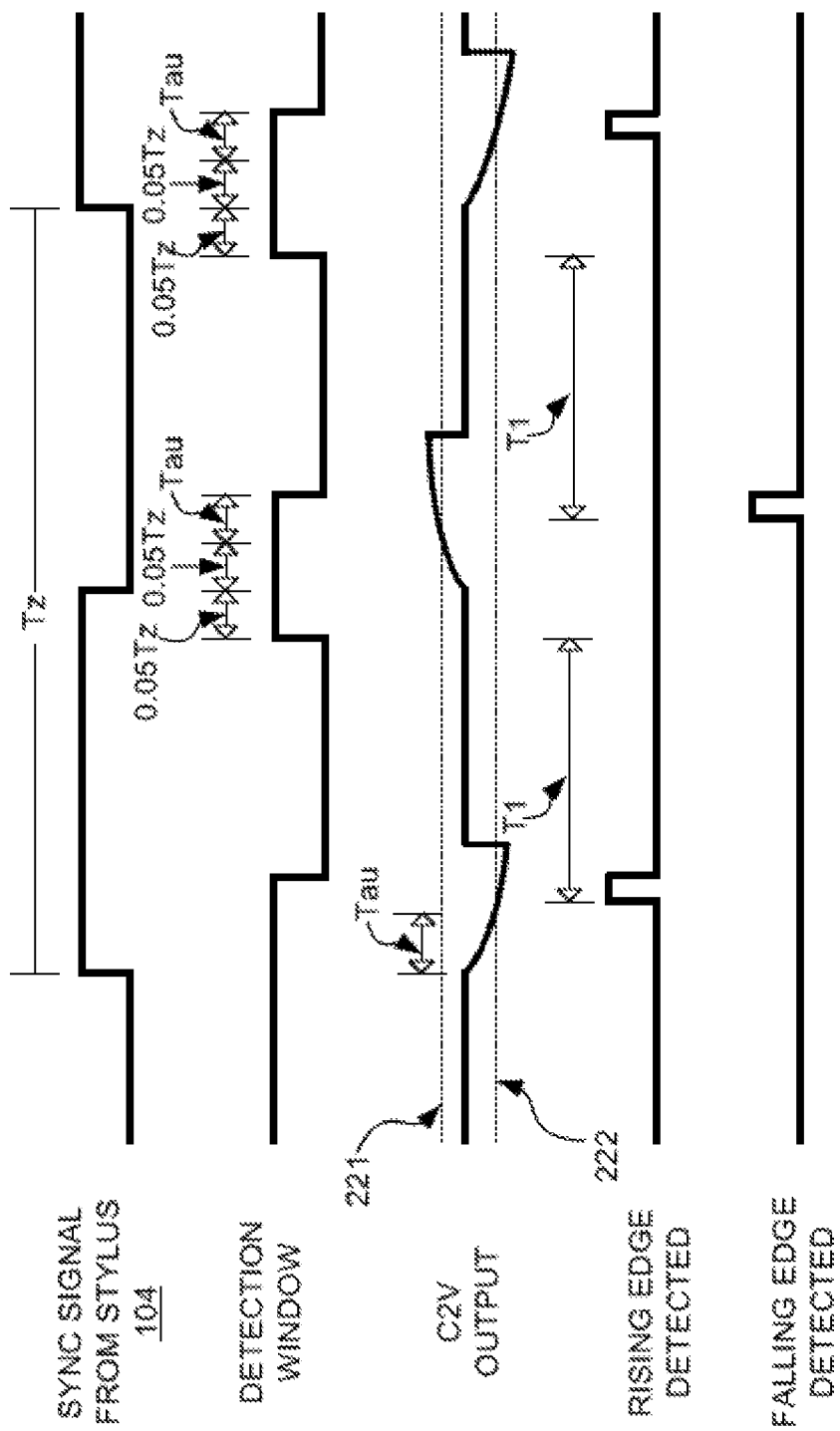
FIG. 2 is a timing diagram of synchronization signals in the two computing devices of FIG. 1 detected during synchronization windows according to an embodiment.

Turning attention now to the next figure, FIG. 2 shows a timing diagram of synchronization signals in the two computing devices of FIG. 1 detected during synchronization windows according to an embodiment. As one can see, the synchronization signal 104 received from the stylus 102 comprises a periodic series of pulses having rising edges and falling edges. The period between successive rising edges (or falling edges) is shown as Tz. In order to synchronize the stylus 102 to the touch screen device 101, the touch screen controller seeks to detect 16 consecutive pairs of rising edges and falling edges of the synchronization signal (although as mentioned previously, this figure could be more or less than 16). Instead of continuously having detection circuitry enabled for detection of the rising or falling edges of the synchronization signal 104, the window generator 152 (FIG. 1) may generate a window wherein the detection circuitry (e.g., the charge-to-voltage converter 120 of FIG. 1) is enabled for detection of rising or falling edges. As shown in the timing diagram of FIG. 2, the detection window is a high logic level signal when the detection circuitry is enabled and is a low logic level signal when the detection circuitry is disabled.

When the first detection window is open, a first rising edge of the synchronization signal 104 is detected which then causes the output of the charge-to-voltage converter 120 to fall toward the negative threshold 222. Once the output of the charge-to-voltage converter 120 reaches or exceeds the negative threshold 222, i.e., after a time delay Tau, a rising edge detected signal is generated. Similarly, when the second detection window is open, a first falling edge of the synchronization signal 104 is detected which then causes the output of the charge-to-voltage converter 120 to rise toward the positive threshold 221. Once the output of the charge-to-voltage converter 120 reaches or exceeds the positive threshold 221, i.e., after the time delay Tau, a falling edge detected signal is generated.

This cycle may repeat again as the beginning of the next detection sequence is shown in FIG. 2 wherein the third detection window is open and a second rising edge of the synchronization signal 104 is detected. This again causes the output of the charge-to-voltage converter 120 to fall toward the negative threshold 222. Once the positive threshold 221 is reached again after the time delay Tau, a second rising edge detected signal is generated. In the absence of noise affecting the detection of rising edges and falling edges of the synchronization signal during the times that the detection windows are open, this process may continue until the requisite number of rising edge/falling edge pairs are detected to ensure synchronization.

Overall effects of noise may be marginalized by having the detection windows open for only specific amounts of time and at times based on previous detection of edges. Thus, in this embodiment, each detection window is opened after a specific time T from when the last edge was detected. The time T has a duration related to the overall period Tz of the synchronization signal 104. In this respect, the duration of time T in which there is no detection window open is equal to approximately half of the period Tz. More specifically, in one embodiment the wait time T for opening a next detection window is defined by:

$$T=0.5Tz-Tau-0.05Tz$$

Thus, the wait time T to open a next detection window is equal to half of the period Tz, less the delay time Tau needed for the charge-to-voltage converter 120 to detect an edge and less half of a 10% (although this percentage may be any percentage and may be programmable dynamically adaptable to different window durations) frequency error deviation in the period (0.05 Tz). In this respect, the next detection window is opened after a wait time T in response to detecting an edge of the synchronization signal 104.

Furthermore, the detection window remains active for a specific amount of time as well so as to not remain open indefinitely until an edge (or noise) is detected. The detection window open time is shown in the embodiment of FIG. 2 as half of a 10% period error from a first period (0.05 Tz) plus half of a 10% error from a second period (also 0.05 Tz) plus the delay time Tau for edge detection by the charge-to-voltage converter 120. This duration of the detection window being open is equal to approximately one tenth (plus Tau) of the overall synchronization signal 104 period Tz. By keeping the detection window open for only a short amount of time, the possibility of noise being misinterpreted as an edge or affecting an actual edge causing a misinterpretation is reduced. Further, by triggering the opening of subsequent detection windows based on the previously detected edge, any period drift issues may also be accommodated. However, noise may still affect the detection of edges during the detection windows. Such errors may be further dealt with by applying additional algorithmic solutions as discussed next with respect to FIG. 3.

Figure 3:
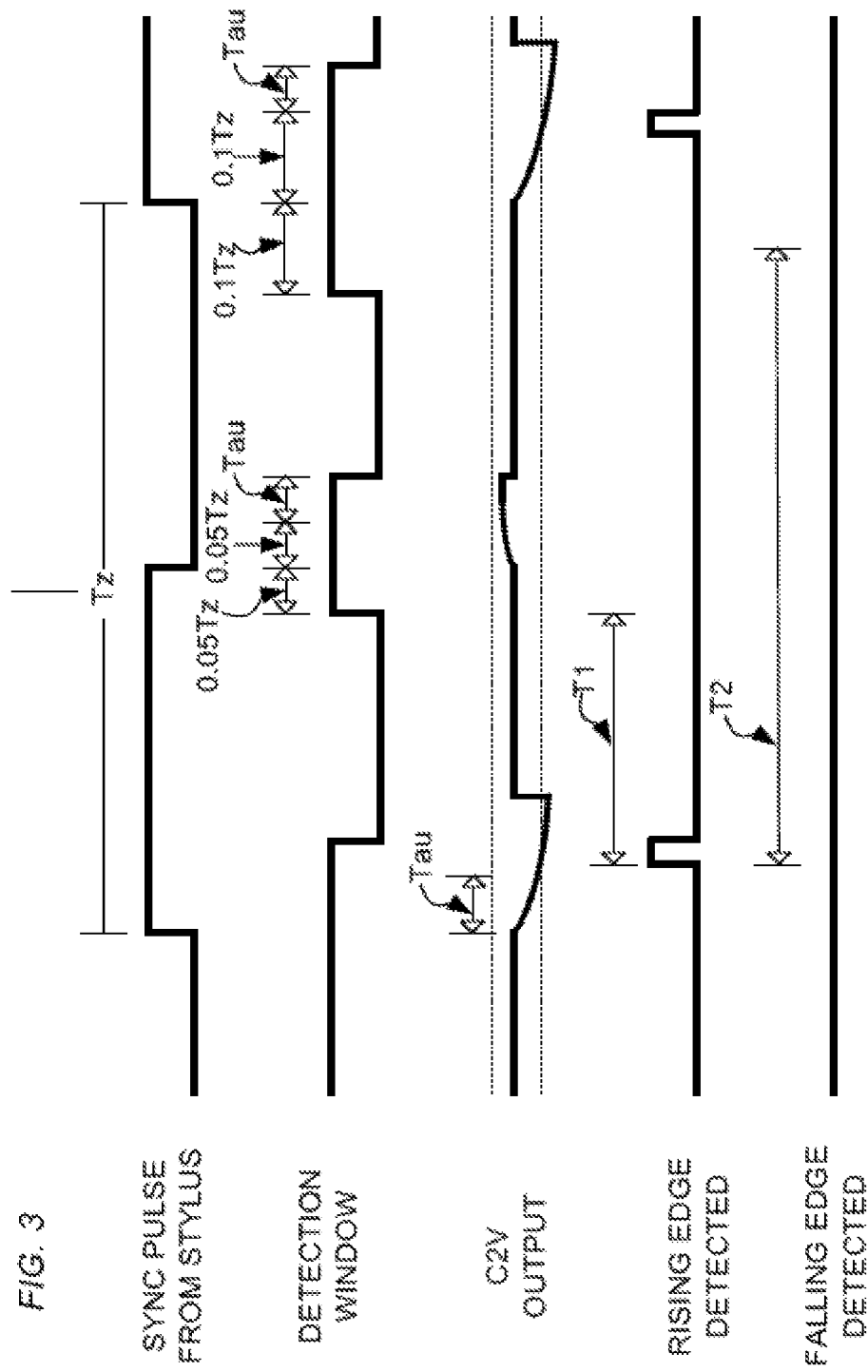
FIG. 3 is a timing diagram of synchronization signals in the two computing devices of FIG. 1 wherein one synchronization signal is not detected during a detection window according to an embodiment.

FIG. 3 is a timing diagram of synchronization signals in the two computing devices of FIG. 1 wherein one synchronization signal is not detected during a detection window according to an embodiment. As with FIG. 2, the synchronization signal 104 received from the stylus 102 comprises a periodic series of pulses having rising edges and falling edges. The period between successive rising edges (or falling edges) is shown as Tz. As before, in order to synchronize the stylus 102 to the touch screen device 101, the touch screen controller seeks to detect 16 consecutive pairs of rising edges and falling edges of the synchronization signal. Instead of continuously having detection circuitry enabled for detection of the rising or falling edges of the synchronization signal 104, the window generator 152 (FIG. 1) may generate a window wherein the detection circuitry is enabled for detection of rising or falling edges. As shown in the timing diagram of FIG. 3, the detection window is a high logic level signal when the detection circuitry is enabled and is a low logic level signal when the detection circuitry is disabled.

During the first detection window is open, a first rising edge of the synchronization signal 104 is detected which then causes the output of the charge-to-voltage converter 120 to fall toward the negative threshold 222. When the output of the charge-to-voltage converter 120 reaches or exceeds the negative threshold 222, a rising edge detected signal is generated. As discussed above, the second detection window is then triggered to open after delay time T as measured from the rising edge detected signal. However, in this embodiment, when the second detection window is open, a first falling edge of the synchronization signal 104 is compromised by noise and yields a weak signal that causes the output of the charge-to-voltage converter 120 to rise toward the positive threshold 221 but fails to reach it or exceed it. Thus, a falling edge detected signal is not generated as the noise has mitigated the magnitude of the falling edge of the synchronization signal.

In some embodiments, the failure to detect the falling edge may be interpreted as an overall failure to synchronize thereby arresting the synchronization process and disabling the synchronization algorithm until reinitiated. This may ultimately be a proper way to interpret the failure to detect a subsequent edge as the first edge may have been generated from noise in the first place and was not actually an edge of any synchronization signal 104. However, in other embodiments, the algorithm may take into account the possibility of noise causing a misreading of a subsequent edge (in this example, the falling edge). Therefore, instead of resetting or arresting the synchronization procedure, the algorithm may set a new delay time T2 that is approximately equal to the period Tz in an effort to open a third detection window in an attempt to detect a second rising edge (the third overall edge).

Overall effects of noise may be marginalized by having subsequent detection windows open for only specific amounts of time and at times based on previous successful detection of edges. Thus, in this embodiment, the second overall detection window is opened after a specific time T (as described above with respect to FIG. 2 from when the last edge was detected. When the edge expected during the second overall detection window is not detected, the algorithm may then trigger a third overall window after delay time T2 which also has a duration related to the overall period Tz of the synchronization signal 104. More specifically, in one embodiment the wait time T2 for opening a next detection window is defined by:

$$T2=Tz-Tau-0.1Tz$$

Thus, the wait time T2 to open a third overall detection window when failure to detect an edge in the second overall detection window occurs is equal to the period Tz, less the delay time Tau needed for the charge-to-voltage converter 120 to detect an edge and less half of a 20% error deviation in the period (0.1 Tz). In this respect, the third overall detection window is opened after a wait time T2 in response to detecting an first edge of the synchronization signal 104 but failing to detect a second edge during a second overall detection window.

Furthermore, the third overall detection window remains active for a longer amount of time as well so as account for additional timing error in the synchronization signal. When an edge detection is missed in the second overall window, the third overall detection window open time is shown in the embodiment of FIG. 3 as half of a 20% period error from a first period (0.1 Tz) plus half of a 20% error from a second period (also 0.1 Tz) plus the delay time Tau for edge detection by the charge-to-voltage converter 120. This duration of the detection window being open is equal to approximately one fifth (plus Tau) of the overall synchronization signal 104 period Tz.

Figure 4:
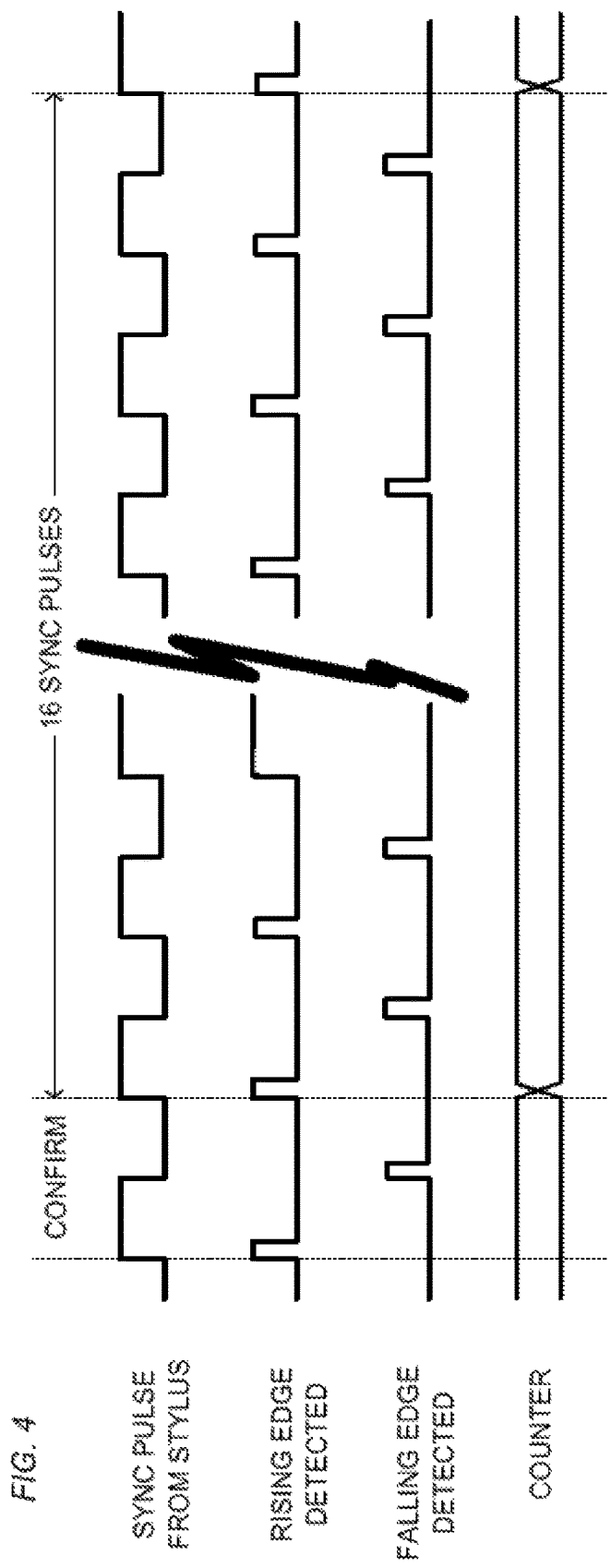
FIG. 4 is a timing diagram of synchronization signals in the two computing devices of FIG. 1 after synchronization has been accomplished according to an embodiment.

FIG. 4 is a timing diagram of synchronization signals in the two computing devices of FIG. 1 after synchronization has been accomplished according to an embodiment. Typically, a synchronization procedure may be initiated when the touch screen controller receives a confirmation signal for initiation of synchronization. In this embodiment, the confirmation signal is a rising edge followed by a falling edge followed by rising edge. Other confirmation signals may also trigger the synchronization procedure but are not discussed herein.

Once the synchronization procedure is started, the touch screen controller expects to see a requisite number of consecutive edge pairs (one rising and one falling) at intervals roughly approximate to the synchronization signal period. After each pair of edges is detected, the counter 151 in the touch screen controller 150 (FIG. 1) may be incremented. Once the requisite number of edge pairs are detected (e.g., 8, 16, 32, etc.) the touch screen controller 150 determines that the stylus 102 and the touch screen device 101 are now in synchronization whereby additional communication between the devices may ensue.

A number of embodiments exist wherein the synchronization process may be interrupted and terminated after one or more edges have failed to be detected. Thus, in one embodiment, a single failed edge detection ay result in the interruption of the synchronization procedure. In other embodiments, two or three edges may go undetected before the synchronization procedure in interrupted. Further as discussed above, the algorithm for duration and timing of the detection windows may be adjusted if one or more edges are undetected during previous detection windows. Once the synchronization period is interrupted, the touch screen controller 103 may reset the synchronization detection procedure awaiting a new confirmation pattern.

The embodiments of FIGS. 1-4 may be in an overall system as described next with respect to FIG. 5.

Figure 5:
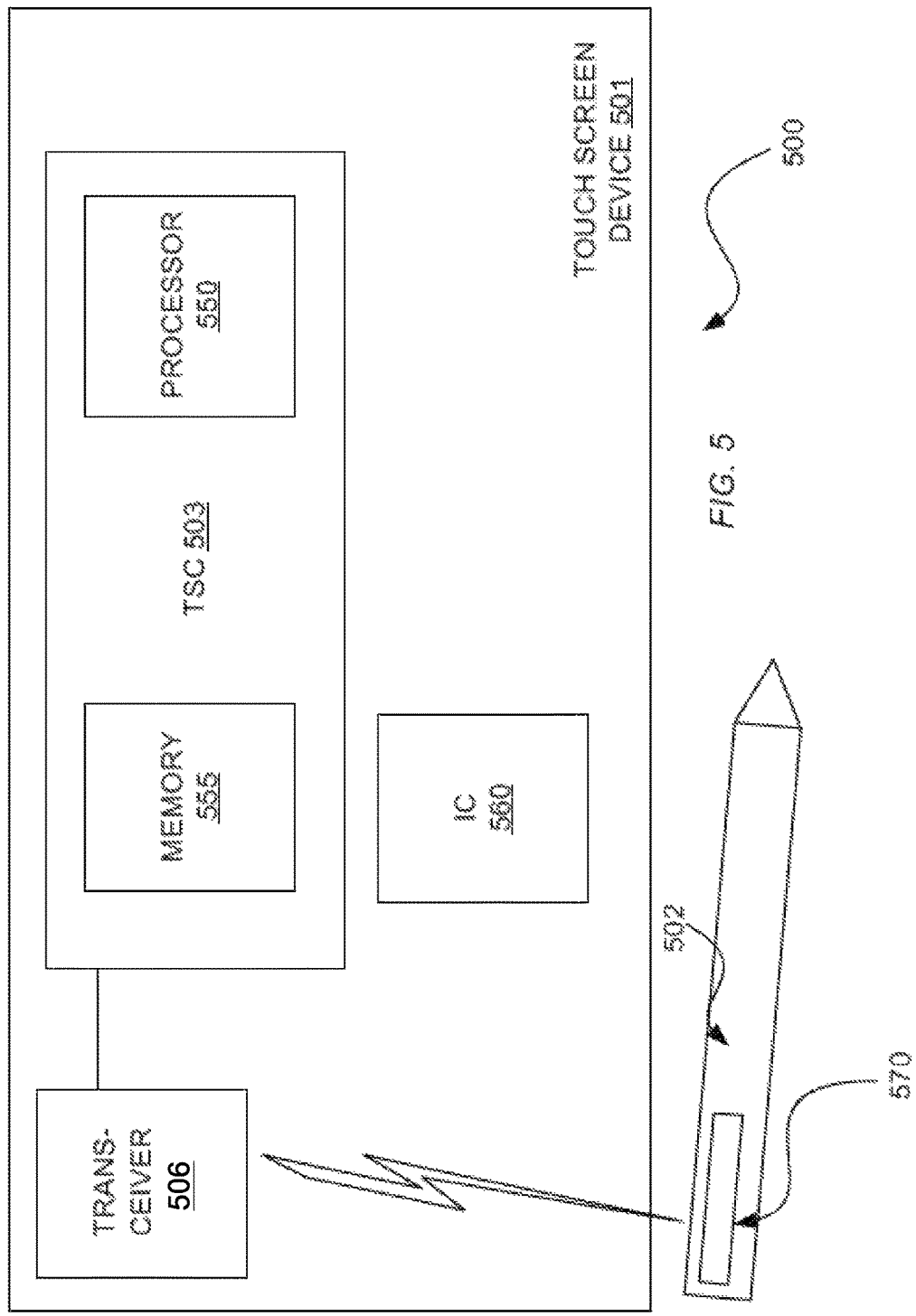
FIG. 5 is a block diagram of a computing system having the two computing devices of FIG. 1 according to an embodiment.

FIG. 5 is a block diagram of a computing system 500 having the two computing devices of FIG. 1 according to an embodiment. The two devices in this embodiment are, as discussed in FIG. 1, a touch screen device 501 and an associated stylus 502 that together comprise the computing system 500 having the communicative capabilities as described herein. In the embodiment shown in FIG. 5, the communications signals may be received by and transmitted from the touch screen device 501 via a touch screen 505 that may be coupled to a touch screen controller 503.

The touch screen controller 503 may be a single integrated circuit die or multiple integrated circuit dies. Further, the touch screen controller 503 may include additional electronic components such as memory 555 or processor 550. These components may also be disposed on the same integrated circuit die or on separate integrated circuit dies. Further yet, the touch screen controller may be coupled to an additional electronic component disposed on a separate integrated circuit die such as IC 560.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A synchronization detector, comprising:
   a receiver configured to receive a synchronization signal originating from a stylus external to the synchronization detector, the synchronization signal having a period and edges; and
   a window generator configured to generate an activating signal for the receiver, the activating signal enabling the receiver to attempt detection during each of a plurality of time windows, the receiver being disabled outside each of the plurality of time windows, the plurality of time windows including:
   a first time window for detecting a first subsequent synchronization signal edge in response to a first synchronization signal edge;
   a second time window for detecting a second subsequent synchronization signal edge following the first subsequent synchronization signal edge in response to a failure to detect the first subsequent synchronization signal edge within the first time window, wherein the second time window has a duration that is greater than that of the first time window and that is related to the period of the synchronization signal; and a third time window for detecting a third subsequent synchronization signal edge following the second subsequent synchronization edge signal in response to a failure to detect the second subsequent synchronization signal edge within the second time window, wherein the third time window has a duration that is greater than that of the second time window and that is related to the period of the synchronization signal;

a comparator configured to receive output from the receiver when the receiver is enabled, to compare that output to a reference threshold, to assert a detection signal when the output from the receiver is greater than the reference threshold, and to deassert the detection signal when the output from the receiver is less than the reference threshold; and a counter receiving the detection signal, and configured to count a number of assertions of the detection signal.

2. The synchronization detector of claim 1, wherein a duration of the second time window is approximately one tenth of the period of the synchronization signal plus a detection delay time.

3. The synchronization detector of claim 1, wherein a duration of the second time window is approximately one fifth of the period of the synchronization signal plus a detection delay time.

4. The synchronization detector of claim 1, wherein the window generator asserts the activating signal during each of the plurality of time windows and deasserts the activating signal outside each of the plurality of time windows.

5. The synchronization detector of claim 1, wherein the first synchronization signal edge comprises a rising edge.

6. The synchronization detector of claim 1, wherein the first synchronization signal edge comprises a falling edge.

7. The synchronization detector of claim 1, wherein the receiver comprises a charge to voltage converter.

8. A synchronization detector comprising:
a receiver configured to receive a synchronization signal originating from a stylus external to the synchronization detector, the synchronization signal having a period and edges; and
a window generator configured to generate an activating signal for the receiver, the activating signal enabling the receiver to attempt detection during each of a plurality of time windows, the receiver being disabled outside each of the plurality of time windows, the plurality of time windows including:
a first time window for detecting a first subsequent synchronization signal edge in response to a first synchronization signal edge;
a second time window for detecting a second subsequent synchronization signal edge following the first subsequent synchronization signal edge in response to a failure to detect the first subsequent synchronization signal edge within the first time window, wherein the second time window has a duration that is greater than that of the first time window and that is related to the period of the synchronization signal; and
a third time window for detecting a third subsequent synchronization signal edge following the second subsequent synchronization edge signal in response to a failure to detect the second subsequent synchronization signal edge within the second time window, wherein the third time window has a duration that is greater than that of the second time window and that is related to the period of the synchronization signal;
wherein the window generator is configured to generate the activating signal after a delay time that is a function of half the period of the synchronization signal and a transient period representing a delay time between occurrence of an edge in the synchronization signal and detection of the edge by the receiver.

9. The synchronization detector of claim 8, wherein a duration of the second time window is approximately one tenth of the period of the synchronization signal plus a detection delay time.

10. The synchronization detector of claim 8, wherein a duration of the second time window is approximately one fifth of the period of the synchronization signal plus a detection delay time.

11. The synchronization detector of claim 8, wherein the window generator asserts the activating signal during each of the plurality of time windows and deasserts the activating signal outside each of the plurality of time windows.

12. The synchronization detector of claim 8, wherein the first synchronization signal edge comprises a rising edge.

13. The synchronization detector of claim 8, wherein the first synchronization signal edge comprises a falling edge.

14. The synchronization detector of claim 8, wherein the receiver comprises a charge to voltage converter.

15. A synchronization detector, comprising:
a receiver configured to receive a synchronization signal having a period and edges; and
a window generator configured to generate an activating signal for the receiver, the activating signal enabling the receiver to attempt detection during each of a plurality of time windows, the receiver being disabled outside each of the plurality of time windows, the plurality of time windows including:
a first time window for detecting a first subsequent synchronization signal edge in response to a first synchronization signal edge;
a second time window for detecting a second subsequent synchronization signal edge following the first subsequent synchronization signal edge in response to a failure to detect the first subsequent synchronization signal edge within the first time window, wherein the second time window has a duration that is greater than that of the first time window and that is related to the period of the synchronization signal; and
a third time window for detecting a third subsequent synchronization signal edge following the second subsequent synchronization edge signal in response to a failure to detect the second subsequent synchronization signal edge within the second time window, wherein the third time window has a duration that is greater than that of the second time window and that is related to the period of the synchronization signal;
a comparator configured to receive output from the receiver when the receiver is enabled, to compare that output to a reference threshold, to assert a detection signal when the output from the receiver is greater than the reference threshold, and to deassert the detection signal when the output from the receiver is less than the reference threshold; and a counter receiving the detection signal, and configured to count a number of assertions of the detection signal.

16. The synchronization detector of claim 15, wherein a duration of the second time window is approximately one tenth of the period of the synchronization signal plus a detection delay time.

17. The synchronization detector of claim 15, wherein a duration of the second time window is approximately one fifth of the period of the synchronization signal plus a detection delay time.

18. The synchronization detector of claim 15, wherein the window generator asserts the activating signal during each of the plurality of time windows and deasserts the activating signal outside each of the plurality of time windows.

19. The synchronization detector of claim 15, wherein the first synchronization signal edge comprises a rising edge.

20. The synchronization detector of claim 15, wherein the first synchronization signal edge comprises a falling edge.

21. The synchronization detector of claim 15, wherein the receiver comprises a charge to voltage converter.

22. A synchronization detector, comprising:
a receiver configured to receive a synchronization signal having a period and edges; and
a window generator configured to generate an activating signal for the receiver, the activating signal enabling the receiver to attempt detection during each of a plurality of time windows, the receiver being disabled outside each of the plurality of time windows, the plurality of time windows including:
a first time window for detecting a first subsequent synchronization signal edge in response to a first synchronization signal edge;
a second time window for detecting a second subsequent synchronization signal edge following the first subsequent synchronization signal edge in response to a failure to detect the first subsequent synchronization signal edge within the first time window, wherein the second time window has a duration that is greater than that of the first time window and that is related to the period of the synchronization signal; and
a third time window for detecting a third subsequent synchronization signal edge following the second subsequent synchronization edge signal in response to a failure to detect the second subsequent synchronization signal edge within the second time window, wherein the third time window has a duration that is greater than that of the second time window and that is related to the period of the synchronization signal;
wherein the window generator is configured to generate the activating signal after a delay time that is a function of half the period of the synchronization signal and a transient period representing a delay time between occurrence of an edge in the synchronization signal and detection of the edge by the receiver.

23. The synchronization detector of claim 22, wherein a duration of the second time window is approximately one tenth of the period of the synchronization signal plus a detection delay time.

24. The synchronization detector of claim 22, wherein a duration of the second time window is approximately one fifth of the period of the synchronization signal plus a detection delay time.

25. The synchronization detector of claim 22, wherein the window generator asserts the activating signal during each of the plurality of time windows and deasserts the activating signal outside each of the plurality of time windows.

26. The synchronization detector of claim 22, wherein the first synchronization signal edge comprises a rising edge.

27. The synchronization detector of claim 22, wherein the first synchronization signal edge comprises a falling edge.

28. The synchronization detector of claim 22, wherein the receiver comprises a charge to voltage converter.

* * * * *